United States Patent [19]

Hosick et al.

[11] 3,845,465

[45] Oct. 29, 1974

[54] ASSOCIATIVE STORAGE APPARATUS FOR COMPARING BETWEEN SPECIFIED LIMITS

[75] Inventors: Charles L. Hosick; Joseph A. Beek, both of Placentia, Calif.

[73] Assignee: The United States of America as represented by the Secretary of the United States Air Force, Washington, D.C.

[22] Filed: Jan. 12, 1973

[21] Appl. No.: 323,152

[52] U.S. Cl. ............... 340/146.2, 235/177, 340/149

[51] Int. Cl. ............................................ G11b 5/62

[58] Field of Search ......... 340/146.2, 149; 235/177, 235/92 CA, 61.7

[56] References Cited

UNITED STATES PATENTS

| | | | |
|---|---|---|---|
| 3,183,484 | 5/1965 | Christiansen et al. | 235/177 |
| 3,217,293 | 11/1965 | Metz | 340/146.2 |
| 3,288,987 | 11/1966 | Amato | 235/177 |
| 3,290,647 | 12/1966 | Joseph et al. | 340/146.2 |
| 3,465,309 | 9/1969 | Chow | 340/146.2 |

*Primary Examiner*—Malcolm A. Morrison
*Assistant Examiner*—Errol A. Krass
*Attorney, Agent, or Firm*—Harry A. Herbert, Jr.; William Stepanishen

[57] ABSTRACT

An associative storage apparatus for comparing digital data with a set of specified limits to determine whether the data is within the tolerance of the two limits.

2 Claims, 2 Drawing Figures

| $I_3$ | $I_4$ | REGISTER |
|---|---|---|
| 0 | 0 | LOWER LIMIT |
| 0 | 1 | HIGHER LIMIT |
| 1 | 0 | STORAGE |
| 1 | 1 | NOTHING |

ASSOCIATIVE STORAGE APPARATUS FOR COMPARING BETWEEN SPECIFIED LIMITS

BACKGROUND OF THE INVENTION

The present invention relates broadly to a sorting and storage apparatus and in particular to an associative storage device for sorting out a digital datum which lies between a pair of specified limits.

Sorting steps and techniques are fundamental to many data processing operations. Sorting steps, for example may place information in alphabetic or numeric order. Sorting operations have been particularly difficult, however, especially where there are many different possible units of information to be sorted. Comparator devices are the basic units used in sorters, just as characters are the basic unit of information. By "characters" is meant alphabetic symbols, Arabic numerals and special symbols, but the term is also intended to include binary information and any other basic unit for the representation of recorded information. Prior methods of character comparison have usually required extensive equipment or repetitive routines which require a good deal of time. Thus the methods heretofore in use have employed networks of gating elements arranged to perform the comparison function according to a logical sequence, or the systems have used numerical coding of the information to effectively perform an arithmetic comparison. Both of these techniques are essentially quite difficult because of the many possible characters to be compared, and because of the equipment and time required to perform the operations satisfactorily. Inasmuch as character comparators are the central operating unit in sorting systems, speed is of prime importance in order to use the system most effectively. Moreover, reliability is also indispensable.

In the sorting of digital data problems arise when the data is generated or received at a high rate and an immediate action must be taken based on the sorting of the data. The previous prior art approaches to the problem have been to buffer the data by placing it in temporary storage and then to sort the data at a rate slower than it was received. This approach relied upon the data being received in bursts with enough time between bursts of data for the sorting operation to take place. When this was not the case, the approach has been to provide many comparators in order to sort the data in real or near real time. The disadvantage of this technique is that a large number of components are required with attendant high cost, size, weight, power and low reliability.

SUMMARY

The present invention utilizes a C chip comparator circuit to sort and compare digital data. The C chip comparator is a comparison-between-limits device which provides the capability of sorting and storing data. The C chip comparator compares input digital data with a pair of specified limits to determine whether the data is between the limits. The qualified data is sorted out and stored until required.

It is one object of the invention, therefore, to provide an improved sorting and storage apparatus having the capability for comparing digital data with a set of specified limits.

It is another object of the invention to provide an improved sorting and storage apparatus capable of determining whether the digital data is within the tolerance of the two limits.

It is yet another object of the invention to provide an improved sorting and storage apparatus utilizing a C chip comparator as a compare-between-limits device.

These and other advantages, objects and features of the invention will become more apparent from the following description when taken in conjunction with the illustrative embodiment in the accompanying drawings.

DESCRIPTION OF THE PREFERRED EMBODIMENT

Figure 1:
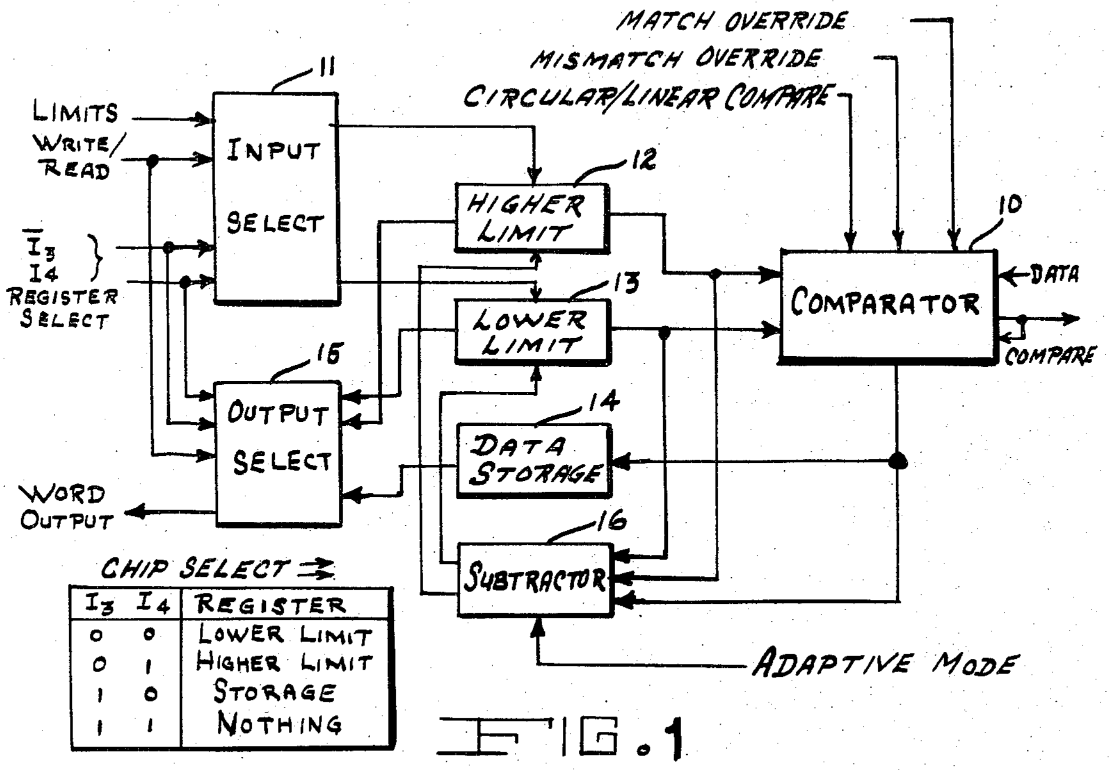
FIG. 1 is a block diagram of a C chip comparator apparatus in accordance with the present invention and, FIG. 2 is a graphical representation of a circular comparison.

Referring now to FIG. 1, there is shown a sorting and storage apparatus utilizing a C chip comparator 10 to compare the input data to a set of prescribed limits. The data limits against which the input data is compared and other control signals are inserted into the input select unit 11. The upper data limit is stored in the higher limit unit 12 and the lower data limit is stored in the lower limit unit 13. The input data is compared in comparator 10 with the upper and lower limits and the data which qualifies is stored in data storage unit 14. The output select unit 15 upon receipt of a proper command signal permits passage of the data which is stored in the data storage unit 14 to be further processed by other systems. The subtractor unit 16 is operative in the adaptive mode and will be discussed in greater detail later.

The comparator 10 provides an 8-bit between lines comparison. The input data is compared to the higher and lower limits which is provided from limit units 12, 13. If the data is between the limits, the compare output is set and the data is stored in the data storage register 14.

The limits are inserted into the C chip by external logic selecting the chip and one of the limit registers, either unit 12 or 13 and commanding a write signal.

The data which is presented on the data line is compared to the higher and lower limits. If the data is greater than or equal to the lower limit and less than the higher limit, a compare output signal is generated. The comparison performed by the C chip may be either linear or circular. The linear comparison is a straight forward arithmetic comparison. If the data and limits are considered to be positive binary fractions, then the circular comparison yields a match if the data is greater than or equal to the lower limit, but less than the lower limit plus one-half; and also less than the higher limit, but greater than or equal to the higher limit minus one-half.

Figure 2:
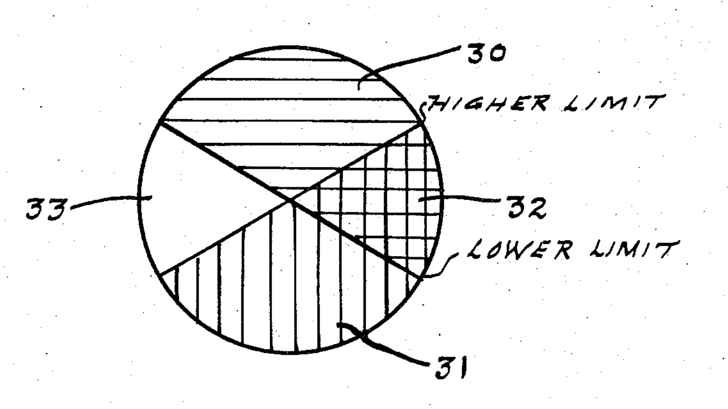

Circular comparison is shown illustrated in FIG. 2. There is shown in FIG. 2 a horizontal cross hatch area 30 which represents the data being greater than or equal to the lower limit, but less than the lower limit plus one-half and the vertical cross-hatch area 31 represents the data being less than the higher limit, but greater than or equal to the higher limit minus one-half. The intersection 32 of the vertical and horizontal cross-hatch then represents where the circular comparison provides a match. Areas 30, 31 and 33 represent a no-match condition.

When the data and limits are angular information, then this comparison may be expressed as: The data must be greater than or equal to the lower limit, but less than the lower limit plus 180°; and also less than the higher limit, but greater than or equal to the higher limit minus 180°. The linear or circular comparison output is selected by the compare select input.

Although each C chip is 8-bits wide, C chips may be used in parallel to increase the word length. This may be done in two ways or in combination of the two. First, the data word may be broken up into data fields, each of which represents independently changing parts of one set of data; e.g., serial number, pay scale, location, etc., for a particular employee, or aircraft identification, range, bearing, and altitude for an air traffic control function, or time of arrival, angle of arrival, frequency, etc., for an electronic countermeasures application. When chips are paralleled, they are referred to as a sorter. Secondly, data within a data field may be expanded beyond 8-bits in 7-bits or less increments by tying the least significant bit of one chip to the most significant bit of the next chip, thereby increasing the data field length to 15, 22, 29, etc.

When these chips are tied together, they must be set to circular comparison and the range of the data; i.e., the difference between the limits must be limited to one-half the range of the least significant 8-bits. Whenever chips are paralleled, their compare outputs are tied together such that all of the chips must match before the data is stored in the internal storage registers; i.e., the entire sorter acts as a single storage element.

An adaptive mode of operation may be selected for any (or all) of the data fields. In the adaptive mode, the limits are adjusted after each match such that the data is more nearly centered between them. The adaptive mode provides a filtering function for data which is jumping about between the limits and/or a tracking function for data which is increasing and/or decreasing in value. In the adaptive mode the limits are adjusted by one-half the difference between the data and the midpoint between the limits.

Whenever the adaptive mode is selected, the limits are adjusted each time a match is found. However, if the adaptive process is under way and new limits are written into the limits registers or if the adaptive mode is cancelled, the current adaptive process is aborted.

Data and limits may be read out of the C chip by selecting the chip and desired register and commanding a read signal. Match and mismatch override controls are provided for the C chip. The match override causes the compare output to indicate a match regardless of whether or not the data is between the limits. The primary purpose of this control is to invalidate a data field without invalidating all of the data; i.e., the sorters disregard that field. The mismatch override control causes the compare output to indicate a mismatch regardless of the data comparison. This control is provided as a sorter enable function; i.e., if any one chip of a sorter indicates a mismatch, the entire sorter is considered to mismatch. Therefore, by providing a mismatch input to one chip in each sorter the sorters can be brought on line by allowing the normal match to occur or off line by commanding a mismatch. This mismatch signal overrides the match signal since the mismatch signal controls entire sorters while the match signal controls chips within sorters.

Although the invention has been described with reference to a particular embodiment, it will be understood to those skilled in the art that the invention is capable of a variety of alternative embodiments within the spirit and scope of the appended claims.

We claim:

1. An associative storage apparatus for comparing digital data to a set of specified limits comprising in combination:

a comparator unit to receive input data, said comparator unit to compare said input data with a set of specified limits, said input data comprising a plurality of words, said comparator unit comparing each word of said plurality of words with said set of specified limits, an input select unit to receive said set of specified limits and write/read control signals, said input select unit passing said set of specified limits upon command of the write control signal, a higher limit storage unit connected to said input select unit to receive the upper limit from said set of specified limits, said upper limit being applied to said comparator unit for comparison with each word of said input data, said comparator unit comparing each word with said upper limit a lower limit storage unit connected to said input select unit to receive the lower limit from said set of specified limits, said lower limit being applied to said comparator unit for comparison with each word of said input data, said comparator unit comparing each word with said lower limit, a data storage register to receive the output of said comparator unit, said comparator unit comparing said input data to said upper limit and to said lower limit, said comparator unit providing an output when said input data is between said upper and lower limit, said output being stored in said data storage register, and an output select unit to receive said output from said data storage unit, said output select unit passing said output of said data storage unit upon the command of the read control signal.

2. An associative storage apparatus as described in claim 1 further including:

a subtractor unit connected to said comparator unit to receive said output of said comparator unit, said subtractor unit being connected to receive the outputs of said higher and lower limit units, said subtractor unit receiving an adaptive mode, said subtractor unit adjusting said set of specified limits by one-half the difference between said input data and the midpoint of said specified limits.

* * * * *